(12) United States Patent
Niemojewski et al.

(10) Patent No.: US 12,719,693 B2
(45) Date of Patent: Aug. 25, 2026

(54) COMPUTER-IMPLEMENTED METHOD FOR IMPROVING SECURITY OF A COMMUNICATION BETWEEN A DLT NETWORK NODES AND AN EXTERNAL COMPUTER SYSTEM

(71) Applicant: BILLON SP. Z O.O., Warsaw (PL)

(72) Inventors: Mateusz Niemojewski, Warsaw (PL); Remigiusz Czerwinski, Warsaw (PL); Marek Stempkowski, Warsaw (PL); Andrzej Horoszczak, Warsaw (PL)

(73) Assignee: BILLON SP. Z O.O., Warsaw (PL)

( * ) Notice: Subject to any disclaimer, the term of this patent is extended or adjusted under 35 U.S.C. 154(b) by 103 days.

(21) Appl. No.: 18/563,576

(22) PCT Filed: May 24, 2022

(86) PCT No.: PCT/EP2022/063979

§ 371 (c)(1),
(2) Date: Nov. 22, 2023

(87) PCT Pub. No.: WO2022/248437

PCT Pub. Date: Dec. 1, 2022

(65) Prior Publication Data

US 2024/0223379 A1 Jul. 4, 2024

(30) Foreign Application Priority Data

May 24, 2021 (EP) .................................... 21175564

(51) Int. Cl.
*H04L 29/06* (2006.01)
*H04L 9/08* (2006.01)
*H04L 9/32* (2006.01)

(52) U.S. Cl.
CPC ........... *H04L 9/3242* (2013.01); *H04L 9/088* (2013.01)

(58) Field of Classification Search
CPC ......... H04L 9/3242; H04L 9/088; H04L 9/50; H04L 2209/80; H04L 9/3247; H04L 9/3239
See application file for complete search history.

(56) References Cited

U.S. PATENT DOCUMENTS 10,250,390 B1 * 4/2019 Gray ..................... H04L 9/3239
10,715,339 B1 * 7/2020 Wei ....................... H04L 9/0894
(Continued)

FOREIGN PATENT DOCUMENTS

CN 110493008 A * 11/2019 ........... H04L 67/104
CN 110855688 A * 2/2020 ........... H04L 69/162
(Continued)

OTHER PUBLICATIONS

Lupascu C, Lupascu A, Bica I. DLT Based Authentication Framework for Industrial IoT Devices. Sensors (Basel). May 4, 2020;20(9):2621. doi: 10.3390/s20092621. PMID: 32375374; PMCID: PMC7248967. (Year: 2020).*
(Continued)

*Primary Examiner* — Sher A Khan
(74) *Attorney, Agent, or Firm* — Polson Intellectual Property Law P.C.; Margaret Polson; Christopher Sylvain

(57) ABSTRACT

A computer-implemented method for improving security of a communication between a DLT network node and an external computer system, comprising steps of: receiving from a DLT network node a first communication message comprising a digitally signed message with a request for communication with the external computer system, a security hash for the digitally signed message, and an identifier assigned to a digital signature used for signing the digitally signed message; calculating a first verification hash from the signed message and the security hash; sending a second communication message comprising the digitally signed message, security hash, identifier and first verification hash
(Continued)

to a verification node in the DLT network for verification; sending the message to the external system when the verification node confirms that the security hash is correct hash for the secure message, the signed message is signed by a private key assigned to the identifier, and the first verification hash matches a second verification hash calculated by the verification node based on the secure message and the security hash.

8 Claims, 6 Drawing Sheets

(56) References Cited

U.S. PATENT DOCUMENTS

| | | | | |
|---|---|---|---|---|
| 11,281,796 | B2 * | 3/2022 | Pratt | H04L 9/50 |
| 11,488,258 | B2 * | 11/2022 | Cross | H04L 9/0825 |
| 11,494,767 | B1 * | 11/2022 | Desai | G06Q 20/3829 |
| 11,621,858 | B2 * | 4/2023 | Irazabal | H04L 9/0833<br>713/158 |
| 2018/0349621 | A1 * | 12/2018 | Schvey | H04L 9/3236 |
| 2019/0081796 | A1 * | 3/2019 | Chow | G06Q 20/34 |
| 2019/0180519 | A1 * | 6/2019 | Hausman | G07B 15/063 |
| 2019/0378127 | A1 * | 12/2019 | Dudar | H04L 9/0637 |
| 2019/0384932 | A1 * | 12/2019 | Pratt | H04W 12/61 |
| 2020/0007558 | A1 | 1/2020 | Inokuchi et al. | |
| 2020/0067708 | A1 * | 2/2020 | Subba | H04L 9/3226 |
| 2020/0128044 | A1 * | 4/2020 | Xie | H04L 9/3239 |
| 2020/0311312 | A1 * | 10/2020 | Yu | H04L 9/0897 |
| 2020/0403799 | A1 | 12/2020 | Gomez-Arevalillo et al. | |

FOREIGN PATENT DOCUMENTS

| | | | | |
|---|---|---|---|---|
| CN | 112073479 | A * | 12/2020 | H04L 63/10 |
| CN | 112637298 | A * | 4/2021 | H04L 67/10 |
| CN | 110855688 | B * | 6/2021 | H04L 69/162 |
| CN | 110493008 | B * | 9/2021 | H04L 9/3236 |
| CN | 110914851 | B * | 2/2024 | H04L 9/50 |
| EP | 4084429 | A1 * | 11/2022 | H04L 9/50 |
| WO | WO-2020076982 | A1 * | 4/2020 | H04L 9/0825 |
| WO | WO-2020161662 | A1 * | 8/2020 | H04L 9/50 |
| WO | WO-2021202289 | A1 * | 10/2021 | H04L 9/50 |

OTHER PUBLICATIONS

International Search Report (ISR) mailed Sep. 5, 2022 in parent international application PCT/EP2022/063979.

Written Opinion of the International Searching Authority (WO-ISA) mailed Sep. 5, 2022 in parent international application PCT/EP2022/063979.

Pending U.S. Appl. No. 18/563,584, filed Nov. 22, 2023, first inventor Horoszczak, applicant BILLON SP. Z O.O.

Islam MD Azharul et al.: "A permissioned Blockchain Based Acces Control System for IOT" 2019 IEEE Internaional Conference on Blockchain, IEEE , Jul. 14, 2019, pp. 469-476 XP033682675, DOI: 10.1109/BLOCKCHAIN.2019.00071 section s IV - VI; figure 2.

Ellul Joshua et al: "Towards External Calls for Blockchain and Distributed Ledger Technology" May 13, 2021, XP055852387 retrieved for Internet: URL:https://arxiv.org/pdf/2105.10399.pdf (retrieved on Oct. 18, 2021).

* cited by examiner

COMPUTER-IMPLEMENTED METHOD FOR IMPROVING SECURITY OF A COMMUNICATION BETWEEN A DLT NETWORK NODES AND AN EXTERNAL COMPUTER SYSTEM

This invention relates to a computer-implemented method for improving security of a communication between a DLT network node and an external computer system, as well as to the computer program product including instructions recorded on a non-transitory computer readable storage medium and configured, when executed by at least one processor, to cause the at least one processor to perform a method according to the invention.

A distributed ledger networks (DLT) are known in the art, according to the commonly accepted definition, DLT network is a distributed ledger (also called a shared ledger or distributed ledger technology or DLT) is a consensus of replicated, shared, and synchronized digital data geographically spread across multiple sites, countries, or institutions. Unlike with a distributed database, there is no central administrator. The distributed ledger database is spread across several nodes (devices) on a peer-to-peer network, where each replicates and saves a copy of the ledger and updates itself independently. The primary advantage is the lack of central authority. When a ledger update happens, each node constructs the new transaction, and then the nodes vote by consensus algorithm on which copy is correct. Once a consensus has been determined, the other nodes update themselves with the new, correct copy of the ledger. Security is accomplished through cryptographic keys and signatures.

A detailed knowledge of the blockchain systems is well documented and a skilled person is familiar with publications describing "mechanics" of the blockchain networks. Textbooks such as The Bitcoin Standard: The Decentralized Alternative to Central Banking, by Saifedean Ammous, published by Wiley; 1st edition (Apr. 24, 2018) ISBN-13: 978-1119473862, Mastering Blockchain: A deep dive into distributed ledgers, consensus protocols, smart contracts, DApps, cryptocurrencies, Ethereum, and more, by Imran Bashir published by Packt Publishing (Aug. 31, 2020) ISBN-13: 978-1839213199, and Mastering Bitcoin: Programming the Open Blockchain, by Andreas M. Antonopoulos published by O'Reilly Media; 2nd edition (Jul. 11, 2017) ISBN-13: 978-1491954386, provide all necessary background knowledge to be familiar with blockchains technology.

Blockchain systems depend heavily on an effective cryptography. The well-known text books provide a full scope of disclosure regarding the algorithms used in cryptography, for example Introduction to Modern Cryptography: Third Edition (Chapman & Hall/CRC Cryptography and Network Security Series) by Jonathan Katz and Yehuda Lindell, Chapman and Hall/CRC; 3rd edition (Dec. 21, 2020) ISBN-13: 978-0815354369.

Based on the above publication digital signatures technology applies the following steps.

In the first step of the process, a hash-value of the message (often called the message digest) is calculated by applying some cryptographic hashing algorithm (for example, MD2, MD4, MD5, SHA1, or other). The calculated hash-value of a message is a sequence of bits, usually with a fixed length, extracted in some manner from the message.

All reliable algorithms for message digest calculation apply such mathematical transformations that when just a single bit from the input message is changed, a completely different digest is obtained. Due to this behaviour, these algorithms are very steady in cryptanalytical attacks; in other words, it is almost impossible, from a given hash-value of a given message, to find the message itself. This impossibility for retrieval of the input message is pretty logical if we take into account that a hash-value of a message could have a hundred times smaller size than the input message. Actually, the computing resources needed to find a message by its digest are so huge that, practically, it is unfeasible to do it.

It is also interesting to know that, theoretically, it is possible for two entirely different messages to have the same hash-value calculated by some hashing algorithm, but the probability for this to happen is so small that in practice it is ignored.

In the second step of digitally signing a message, the information obtained in the first step hash-value of the message (the message digest) is encrypted with the private key of the person who signs the message and thus an encrypted hash-value, also called digital signature, is obtained. For this purpose, some mathematical cryptographic encrypting algorithm for calculating digital signatures from given message digest is used. The most often used algorithms are RSA (based on the number theory), DSA (based on the theory of the discrete logarithms), and ECDSA (based on the elliptic curves theory). Often, the obtained digital signature is attached to the message in a special format to be verified later if it is necessary.

Digital signature technology allows the recipient of given signed message to verify its real origin and its integrity. The process of digital signature verification is purposed to ascertain if a given message has been signed by the private key that corresponds to a given public key. The digital signature verification cannot ascertain whether the given message has been signed by a given person. If we need to check whether some person has signed a given message, we need to obtain his real public key in some manner. This is possible either by getting the public key in a secure way (for example, on a floppy disk or CD) or with the help of the Public Key Infrastructure by means of a digital certificate. Without having a secure way to obtain the real public key of given person, we don't have a possibility to check whether the given message is really signed by this person.

In the first step, a hash-value of the signed message is calculated. For this calculation, the same hashing algorithm is used as was used during the signing process. The obtained hash-value is called the current hash-value because it is calculated from the current state of the message.

In the second step of the digital signature verification process, the digital signature is decrypted with the same encryption algorithm that was used during the signing process. The decryption is done by the public key that corresponds to the private key used during the signing of the message. As a result, we obtain the original hash-value that was calculated from the original message during the first step of the signing process (the original message digests).

In the third step, we compare the current hash-value obtained in the first step with the original hash-value obtained in the second step. If the two values are identical, the verification if successful and proves that the message has been signed with the private key that corresponds to the public key used in the verification process. If the two values differ from one another, this means that the digital signature is invalid and the verification is unsuccessful.

In US2020/0007558 patent application an information verification system is disclosed that includes a first node group including a plurality of nodes, and a second node group including at least one node, and the at least one of nodes included in the second node group includes a request means configured to transmit a request signal for requesting information, the request signal including verification information that is information for use in verification to be generated each time the request signal is transmitted, to at least any node of the first node group, and a verification means configured to verify response information that is information transmitted from any one of the nodes included in the first node group in response to the request signal, the verification means determining, regarding the response information, whether or not desired information that is information requested by the request signal or a digest thereof is included, whether or not correct verification information is included, whether or not a value obtained by applying a one-way function to the response information satisfies a predetermined rule defined for common use between the first node group and the second node group, and a response time that is a time taken between the transmission of the request signal and the obtainment of the desired information, and on the basis of the determination results thereof, assessing the presence or absence of reliability of the desired information or the degree of reliability thereof.

In US2020/0403799 patent application the architecture proposed enables the implementation of dedicated validation policies to leverage the level of trust of any of the connected networks without the need of dedicated infrastructure and maintaining the interconnection and exchange capabilities of the aforementioned approaches. Furthermore, this invention supports the interconnection of any DLT offering smart contract execution without the need of modifying the underlying P2P or consensus protocols, ensuring the support of the underlying functionalities and performance of the interconnected networks. Moreover, the trust enhancement mechanism of this invention is fine-grained, as trust is achieved at a smart contract-level instead of at a network-level, enabling independent smart contracts (distributed programs) to leverage their own trust policy according to their specific use cases. It can be therefore said that, in the present invention, the DLT networks interconnection problem is tackled at a smart contract level.

In classic types of IT solutions a user typically uses a "thin client" which communicates with the backend server. In such cases the backend server—if there's such a need (e.g. core banking system needs to exchange information with the card system)—uses a server-to-server communication channel, and there are many common ways of authentication and securing the channels between them (like HTTPS/TLS for example).

ISLAM MD AZHARUL ET AL: "A Permissioned Blockchain Based Access Control System for IoT", 2019 IEEE INTERNATIONAL CONFERENCE ON BLOCKCHAIN (BLOCKCHAIN), IEEE, 14 Jul. 2019 (2019-07-14), pages 469-476, XP033683675, DOI: 10.1109/BLOCKCHAIN.2019.00071 [RETRIEVED O 2019-12-30] discloses a verification of external requestor systems in respect of access policy.

Ellul Joshua ET AL:"Towards External Calls for Blockchain and Distributed Ledger Technology", 13 May 2021 (2021-05-13), XP055852387, URK: https://arxiv.org/pdf/2105.10399.pdf [retrieved on 2021-10-18] discloses an external calls for blockchain.

In the distributed network every node is a standalone independent application, and in described above approach, focused on securing a transmission channel, would be impossible to use, because such connections should be established separately with every node (e.g. in case of mobile application, there could be hundreds of thousands of them), and the number of nodes in DLT network could change (grow) over time.

The object of the invention is a computer-implemented method according to claim 1. It is a computer implemented method for improving security of a communication between a DLT network node and an external computer system, comprising steps of: receiving from a node of DLT network the first communication message comprising: a digitally signed message with a request for communication with an external computer system, a security hash for the digitally signed message, and an identifier assigned to a digital signature used for signing the digitally signed message, calculating a first verification hash from the signed message and the security hash, sending the second communication message comprising the digitally signed message, the security hash, the identifier and the first verification hash to the verification node in the DLT network for verification, sending the message to the external system when the verification node confirms that the security hash is correct hash for the secure message, and the signed message is signed by a private key assigned to the identifier, the first verification hash matches the second verification hash calculated by the verification node based on the secure message and the security hash.

Further in the method according to the invention the message with a request for communication is signed with a private key related to the assigned identifier.

Further in the method according to the invention the verification node is a member of the same DLT network and applies the same verification method of verification of a signature as the node sending a request for communication.

Further in the method according to the invention, the method for verification of signature is selected from a group comprising: ECDSA, RSA, or DSA.

Further in the method according to the invention the verification node is different from the node sending a request for communication.

Further in the method according to the invention the DLT network node is running on a personal device of the user, in particular a mobile device.

Further an object of the invention is a computer program comprising instructions which, when the program is executed by a computer in a DLT network, cause the computer to carry out steps of the method of claims 1 to 6.

The advantage of the present invention is that it provides increased security to the communication from a DLT network directed to the external system, in a situation the DLT network is having no central administration node.

The details of one or more implementations of the present invention are set forth in relation to the accompanying drawings.

Figure 1:
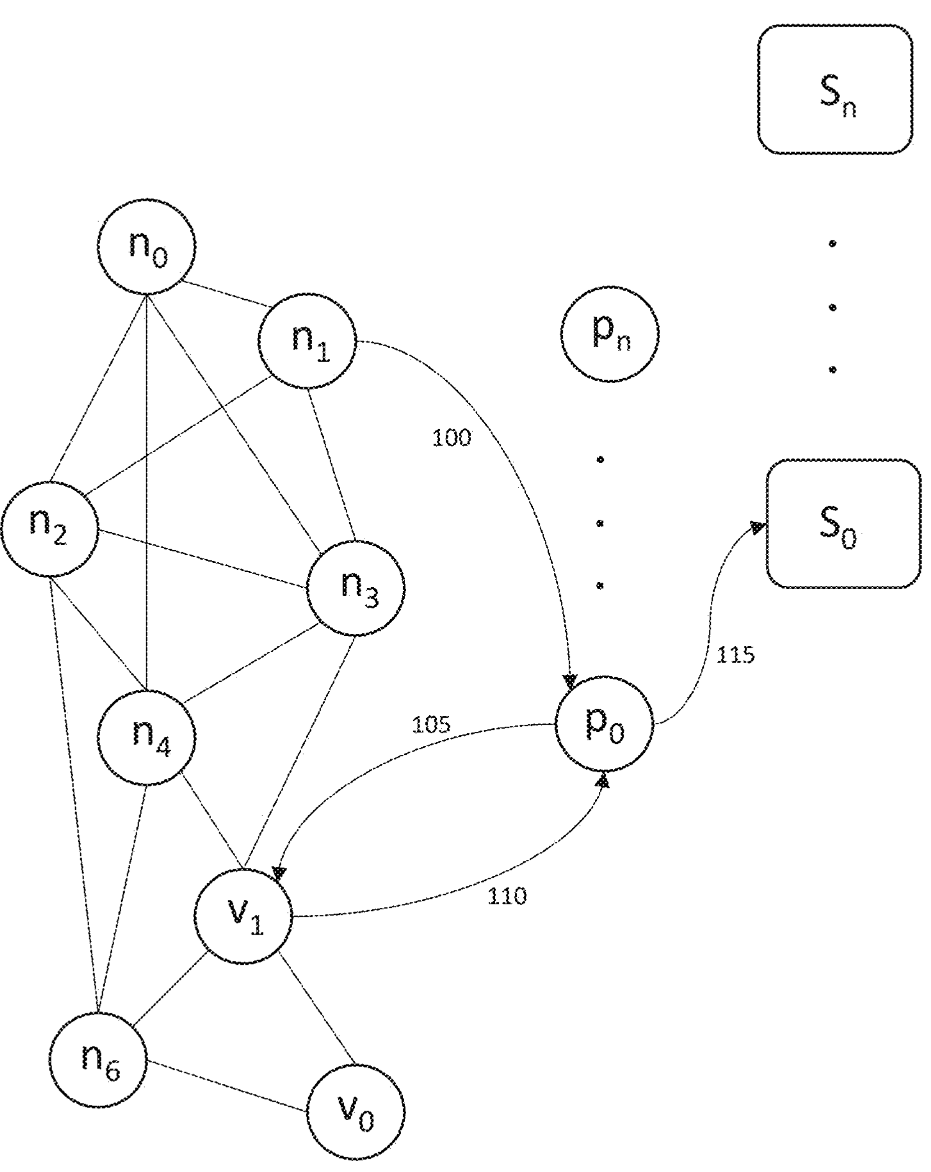
FIG. 1 shows a computer system in which the method according to the invention is implemented.

FIG. 1 shows the preferred implementation of a method a computer-implemented method for improving security of a communication between a DLT network node n and an external computer system S. The method according to the invention implements an interface between a DLT network and external systems, and is typically run on a dedicated proxy computer system p that is able to communicate with nodes n of the DLT network and external computer systems S.

In the preferred embodiment the method according to the invention is run on the proxy system p. The method according to the invention requires at least one proxy system p, however it is preferable to provide a number of proxy systems $p_0$ to $p_n$. Proxy systems may also implement functionality of the DLT network node, however preferably proxy systems are external to the DLT network. The main function of the proxy systems p is to provide a secure and trusted communication between nodes n of the DLT network and external services S, when the DLT network does not have any central or administration node. This can be achieved by introduction of verification nodes v of DLT network. The method according to the present invention is preferably applied in the environment when the DLT network node n is running on a personal device of the user (e.g. a smart TV, or an IoT device), in particular a mobile device (e.g. a mobile phone, or a tablet).

Figure 2:
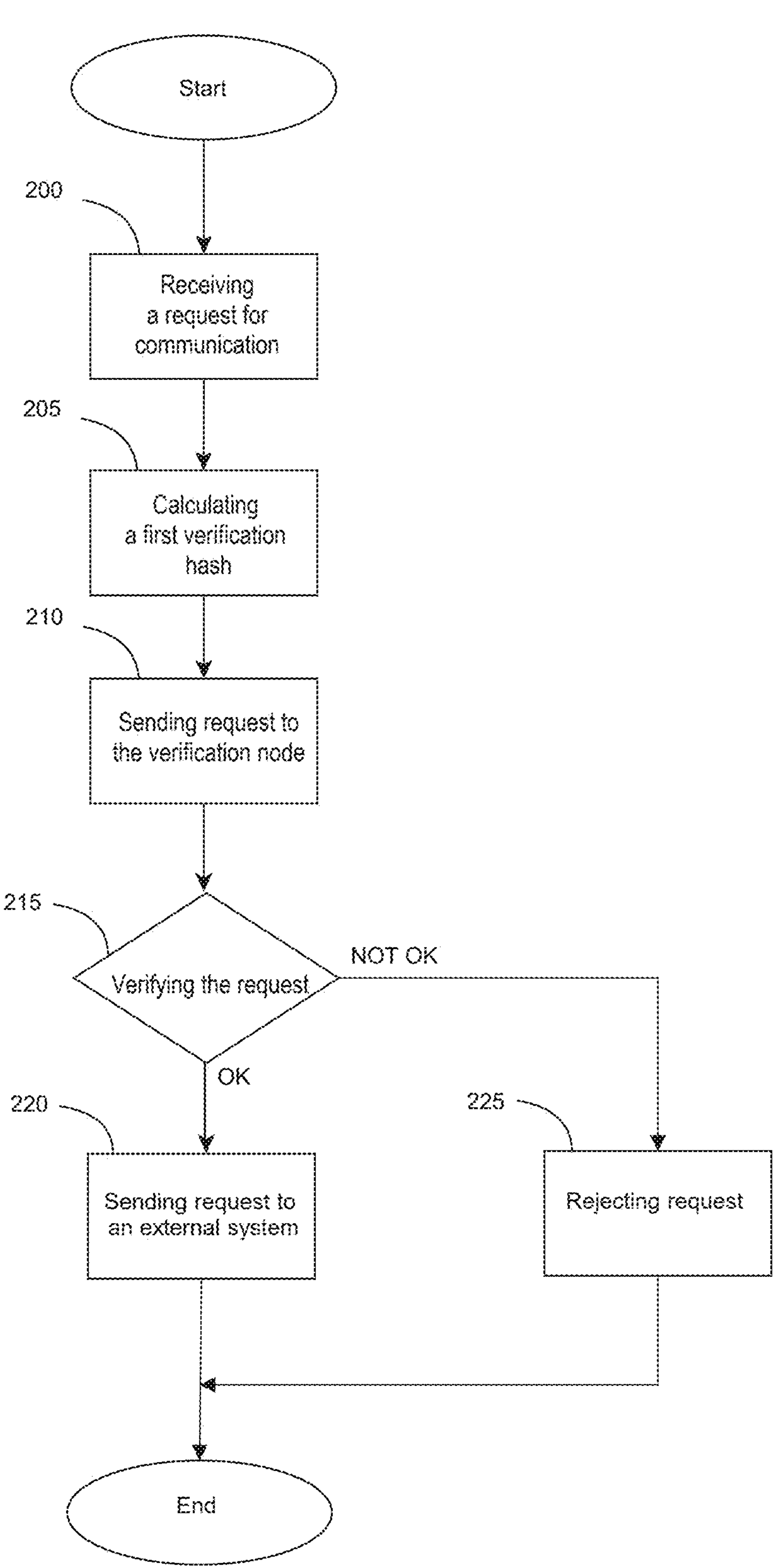
FIG. 2 shows a block diagram of the main steps of the method according to the invention the preferred implementation.
Figure 3:
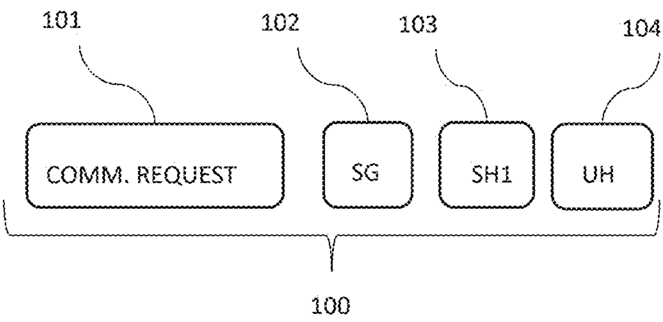
FIG. 3 shows schematically content of the communication messages exchanged according to the invention.
Figure 3:
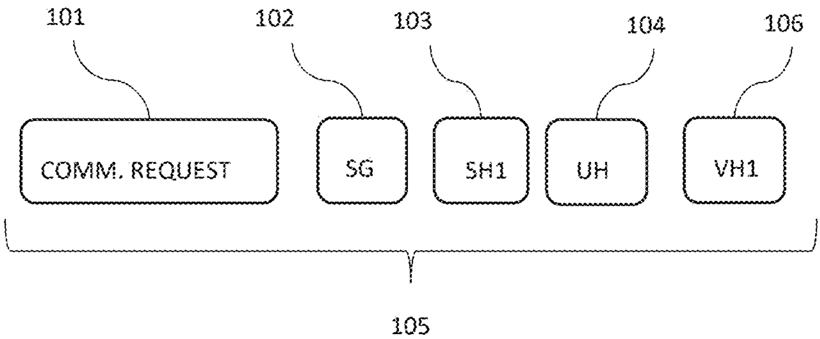
Figure 3:
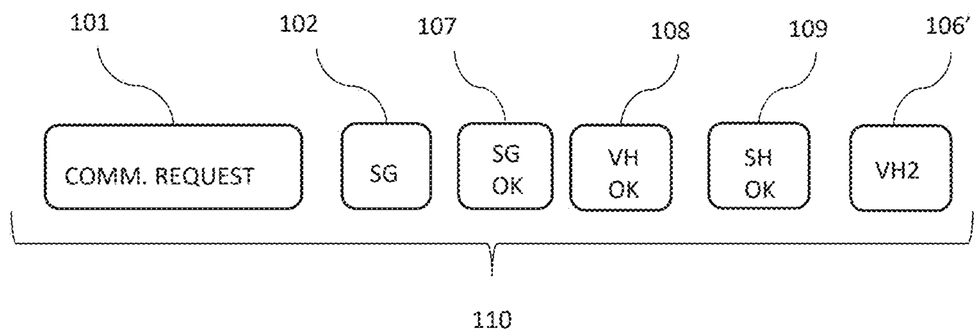

FIG. 2 shows a block diagram of the method according to the invention depicting major steps of the method and their order. FIG. 3 shows schematically content of communication messages exchanged according to the invention.

The method according to the invention comprises a first step 200 of receiving from the node n of DLT network a first communication message 100. The first communication message 100, comprises a message 101 with a request for communication with an external computer system S, a security hash 102 or SH1 for the digitally signed message i.e. a combined request for communication 101 and digital signature 102, and an user hash UH. Details of the creating of the first communication message 100 are described in more detail in relation to FIG. 4.

The next step 205 of the method according to the invention is calculating a first verification hash VH1 from the signed message 101, 102 and the security hash SH. Details of the creating of the second communication message 105 are described in more detail in relation to FIG. 5.

In the following step 210 the proxy system p is sending a second communication message 105 comprising the digitally signed message 101, 102, the security hash SH, the identifier UH and the first verification hash VH1 to a verification node v in the DLT network for verification. Next the verification node v is selected.

A verification step 215 is handled at the verification v node of the DLT network. Details of the verification step 215 and a way of composing a third communication message 110 are described in relation to FIG. 6.

A final step 220 of the method is sending the secure message to the external system S when the verification node v confirms by setting appropriate flags 107, 108 and 109 in the third communication message 110 to the values to OK which means the security hash SH1 is correct hash for the secure message, the signed message is signed by a private key assigned to the identifier UH, and the first verification hash VH1 matches the second verification hash VH2 calculated by the verification node v based on the secure message and the security hash SH1. If the verification node v indicates the secure message does not comply with all of the above indicated verification criteria the secure message is rejected in step 225. The communication message 115 sent to external system S is a regular API formatted request for communication to system or service S.

Figure 4:
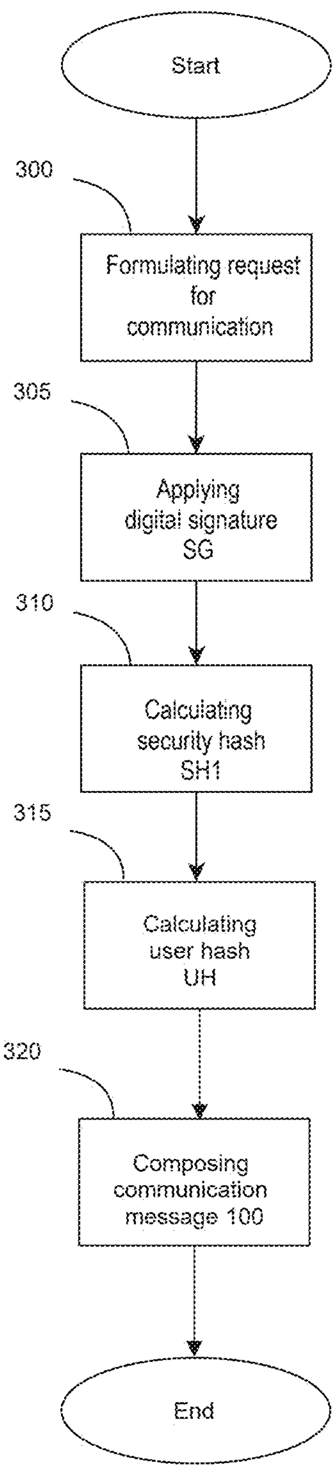
FIG. 4 shows a detail block diagram of creating a first communication message according to the invention.

FIG. 4 shows in detail steps necessary to create the first communication message 100. The first communication message 100 comprises a communication request 101, digital signature 102 or SG. that is generated with a private key assigned to the user of the sending node n, a security hash 103 or SH1 that is generated based on the communication request 101 and the digital signature 102. Further the communication message comprises a user hash 104 or UH.

Referring to FIG. 4 in the step 300 in the node n of the DLT network the communication request 101 is formulated. The communication request 101 is a request formulated in accordance to rules established by the API of the external system or service S. Then in step 305 the node n applies to the communication request 101 a digital signature 102 under the scheme of the private key cryptography. This operation is done according to the known algorithms used in the DLT networks as it is described in the prior art above. The private key is assigned to the user_id of the user operating the node n in the DLT network. In a step 310 the node n of DLT network calculates the security hash 103 or SH1 based on the communication request 101 and digital signature 102. The function of the security hash 103 is to provide an evidence the communication message and digital signature has not been modified during transmission. In the next step 315 a user hash 104 or UH is added to the communication message 100. The user hash 104 that is generated for the user_id of the user that is assigned to the private key used for signing the communication request 101. In the final step 320 all elements of the communication message 100 are combined together for transmission to the proxy system p.

Figure 5:
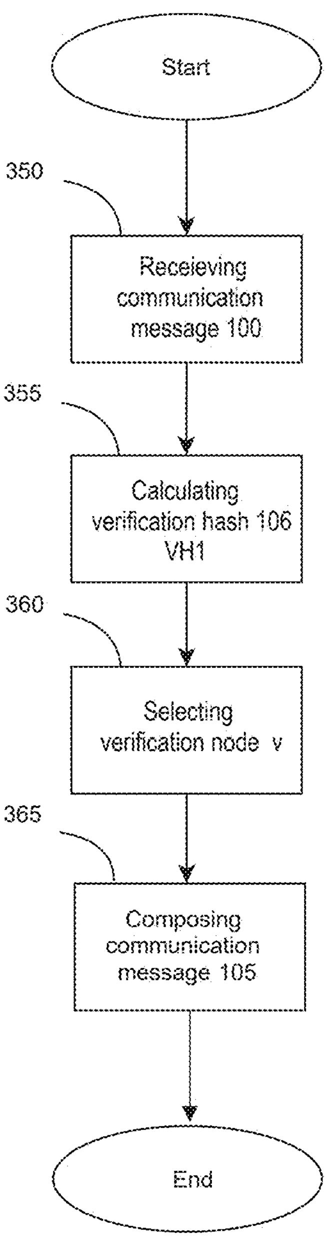
FIG. 5 shows a detail block diagram of creating a second communication message according to the invention.

FIG. 5 shows a block diagram of the process handled at proxy system p when the first communication message 100 is received in order to compose the second communication message 105 to be sent to verification node v. In the step 350 the first communication message 100 is received at proxy system p. In the next step 355 the proxy system p calculates the verification hash 106 or VH1 from the signed message and the security hash SH. The step of calculating the first verification hash VH1 provides an evidence of invariance of the message sent from the proxy system p to the verification node v and an evidence the message sent to verification nodes v is indeed the message to be verified. The verification hash VH1 is calculated according to algorithms known in the art.

In the step 360 the proxy system p is selecting verification node v. The verification node v is selected from the pool of nodes of the DLT network, that are capable to verify digital signature, with maintaining the condition that the verification node v is not the node n requesting communication with the external service S. Due to the nature of the DLT networks, any of nodes of the DLT network has a capabilities to perform verification of digital signature. Selection of verification node v can be done by proxy system p in many different ways, preferably randomly among nodes n of the same DLT network. However other methods of selecting verification node v may be applied and being still within the scope of the invention, e.g. the verification node v is randomly selected form nodes of a different DLT network, or based on latency in communication within the same DLT network.

In the final step 365 the proxy system p is composing the second communication message 105 by combining the request for communication 101, signed with signature 102 with the security hash 103 or SH1 and the verification hash 106 or VH1.

Figure 6:
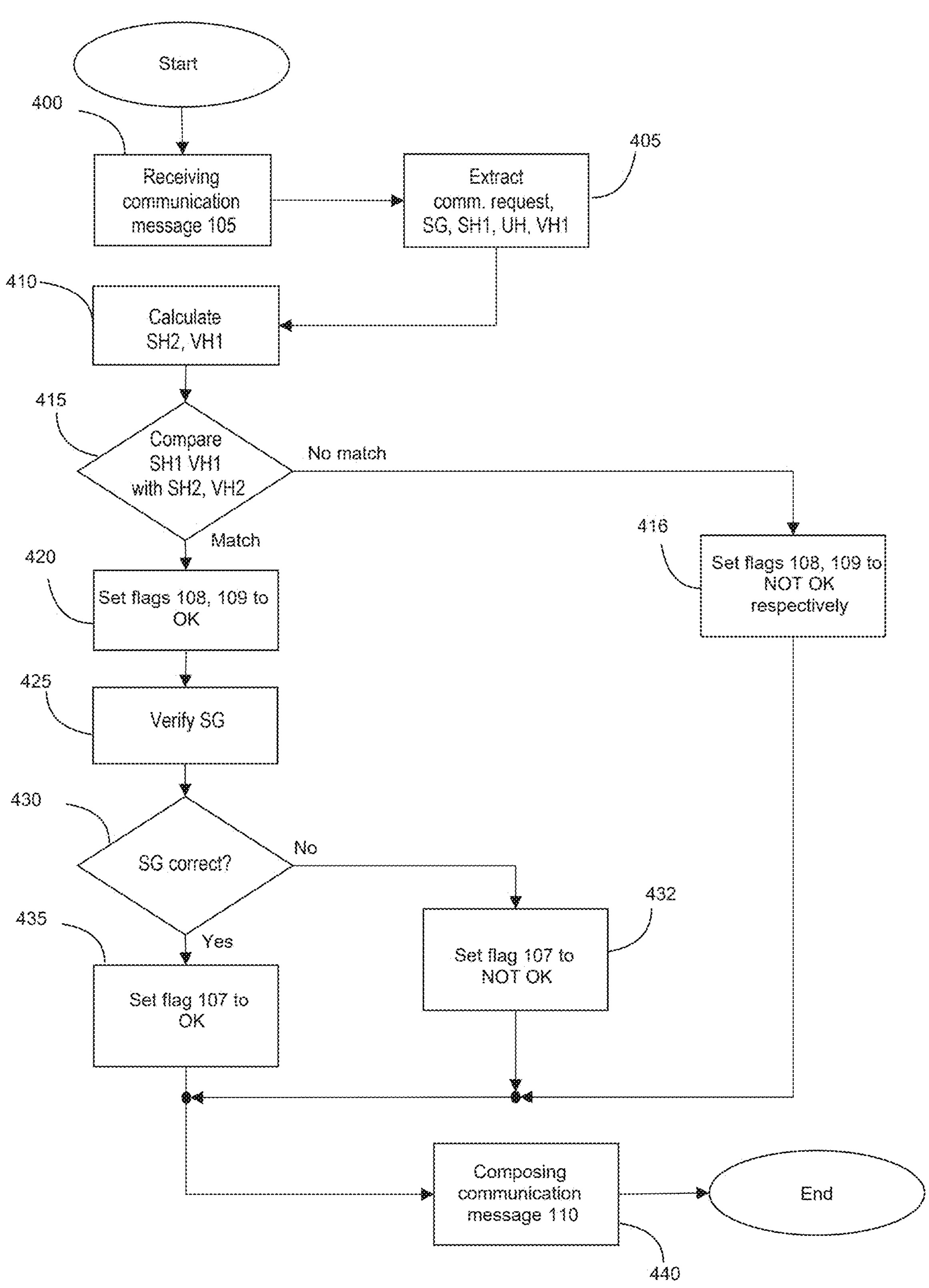
FIG. 6 shows a detail block diagram of the process of verification of the communication request according to the invention.

FIG. 6 shows a block diagram of the verification process handled at the verification node v. The result of the verification process is used by the proxy system p to decide whether the request for communication 101 shall be sent to the external system S or not. In the preferred embodiment the verification node v is a member of the same DLT network as the node n, and applies the same verification method of verification of a digital signature SG, as the node n sending a request for communication. In the first step 400 the verification node v receives the second communication message 105 and next in the step 405 the node v extracts or decomposes the second communication message 105 into its constituents.

Then in step 410 the verification node v of the DLT network independently recalculates security hash SH2 and verification hash VH2. In the next steps node v compares SH1 with SH2 and VH1 with VH2, if the respective hashes matches each other this is an evidence the communication request as signed was not modified by the third party. If there is no match between hashes SH1 and SH2 then verification node v sets the flag 108 to NOT OK. If there is no match between hashes VH1 and VH2 then verification node v sets the flag 109 to NOT OK. Setting negative values to the flags 108, 109 is handled in step 416.

If the security hash SH1 matches the security hash SH2 and verification hash VH1 matches verification hash VH2 the control flow of the process is directed to the step 420 where the respective flags 108 and 109 are set to OK. Flags 108 and 109 are used to signal the proxy system p that the request for communication 101 and attached digital signature SG 102, reached the verification node v unaltered.

Further in the step 425 the verification node v checks if the request for communication 101 is authentic by verification of the digital signature SG 102 applied to the request for communication 101. It is often the case that all nodes of the DLT network are capable of verification of signature according to the scheme applied in this particular network. However this not need to be the case, then the selected pool of nodes of the DLT network is provided with a verification functionality. Preferably the method for verification of signature is selected from a group comprising: ECDSA, RSA, or DSA. This verification provides an evidence that the request for communication is signed by a private key assigned used to generate digital signature SG attached. If the SG is correct signature the verification node v sets the flag 107 to OK in the step 435, if this is not the case then the verification node v sets the flag 107 to NOT OK in the step 432.

FIG. 6 shows a detail block diagram of the third and final step of the method according to the invention that is sending the secure message to the external system when the verification node confirms that the security hash is correct hash for the secure message, and the signed message is signed by a private key assigned to the identifier, the first verification hash matches the a second verification hash calculated by the verification node based on the secure message and the security hash.

While the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation may be made by those skilled in the art without departing from the spirit of this invention.

The invention claimed is:

1. A computer-implemented method for improving security of a communication between a node (n) of a distributed ledger technology (DLT) network and an external computer system (S), comprising:

receiving at a node (p) outside the DLT network from the node (n) of the DLT network a first communication message comprising:

a digitally signed message with a request for communication with the external computer system (S), a security hash for the digitally signed message, and an identifier assigned to a digital signature used for signing the digitally signed message;

calculating a first verification hash from the digitally signed message and the security hash;

sending from the node (p) to a verification node (v) a second communication message comprising:

the digitally signed message, the security hash, the identifier, and the first verification hash to the verification node (v) in the DLT network for verification;

sending the digitally signed message from the node (p) to the external system (S) when the verification node (v) confirms to the node (p) that:

the security hash is correct hash for the secure message, the digitally signed message is signed by a private key assigned to the identifier, and the first verification hash matches a second verification hash calculated by the verification node (v) based on the secure message and the security hash.

2. The method of claim 1, wherein the message with a request for communication is signed with a private key related to the assigned identifier.

3. The method of claim 1, wherein the verification node (v) is a member of the same DLT network and applies the same verification method of verification of a signature as the node (n) sending a request for communication.

4. The method of claim 3, wherein the method for verification of signature is selected from a group comprising: ECDSA, RSA, or DSA.

5. The method of claim 1, wherein the verification node (v) is different from the node (n) sending a request for communication.

6. The method of claim 1, wherein the node (n) is running on a personal device of the user.

7. A non-transitory computer readable medium storing a computer program comprising instructions which, when the computer program is executed by a computer in a distributed ledger technology (DLT) network, cause the computer to carry out steps of:

receiving at a node (p) outside the DLT network from a node (n) of the DLT network a first communication message comprising:

a digitally signed message with a request for communication with the external computer system (S), a security hash for the digitally signed message, and an identifier assigned to a digital signature used for signing the digitally signed message;

calculating a first verification hash from the digitally signed message and the security hash;

sending from the node (p) to a verification node (v) a second communication message comprising:

the digitally signed message, the security hash, the identifier, and the first verification hash to the verification node (v) in the DLT network for verification;

sending the digitally signed message from the node (p) to the external system (S) when the verification node (v) confirms to the node (p) that:

the security hash is correct hash for the secure message, the digitally signed message is signed by a private key assigned to the identifier, and the first verification hash matches a second verification hash calculated by the verification node (v) based on the secure message and the security hash.

8. The method of claim 6, wherein the personal device is a mobile device.

* * * * *